United States Patent
Takagi et al.

(10) Patent No.: US 7,420,627 B2
(45) Date of Patent: Sep. 2, 2008

(54) DIGITAL TELEVISION BROADCAST SIGNAL RECEIVER

(75) Inventors: Toshihiro Takagi, Daito (JP); Tatsuo Miyagawa, Daito (JP)

(73) Assignee: Funai Electric Co., Ltd., Daito-shi (JP)

(*) Notice: Subject to any disclaimer, the term of this patent is extended or adjusted under 35 U.S.C. 154(b) by 555 days.

(21) Appl. No.: 11/184,863

(22) Filed: Jul. 20, 2005

(65) Prior Publication Data

US 2006/0020996 A1 Jan. 26, 2006

(30) Foreign Application Priority Data

Jul. 20, 2004 (JP) .............................. 2004-212178

(51) Int. Cl.
*H04N 5/44* (2006.01)
*H04N 5/50* (2006.01)

(52) U.S. Cl. .................... 348/725; 348/729; 348/731; 348/732; 725/72

(58) Field of Classification Search ................ 348/725, 348/729, 732, 731, 570, 720; 455/193.1, 455/194.2, 226.3, 232.1; 725/72, 38; 375/240.27, 375/346, 347; 714/48, 704, 799
See application file for complete search history.

(56) References Cited

U.S. PATENT DOCUMENTS

| 6,867,819 | B2 * | 3/2005 | Lee ............................ 348/725 |
| 7,136,113 | B2 * | 11/2006 | Lee ............................ 348/725 |
| 7,242,424 | B2 * | 7/2007 | Lee ............................ 348/180 |
| 7,286,190 | B2 * | 10/2007 | Klopfenstein et al. ....... 348/569 |
| 2004/0248517 | A1 * | 12/2004 | Reichgott et al. ........... 455/63.4 |

FOREIGN PATENT DOCUMENTS

| JP | 2003-101426 A | 4/2003 |
| JP | 2003-101428 A | 4/2003 |
| JP | 2003-274312 A | 9/2003 |

* cited by examiner

*Primary Examiner*—David Ometz
*Assistant Examiner*—Jean W Désir
(74) *Attorney, Agent, or Firm*—Crowell & Moring LLP

(57) ABSTRACT

In a multi-directional antenna that is connected to a digital TV broadcast signal receiver, an RF amplifier in which its transmission gains are controlled is installed on the front of a tuner, a BER (BIT ERROR RATE) threshold is set as a reception determination standard to assess received images, and while auto-scanning, the amplification transmission gain level of the RF amplifier is controlled while changing in a phased manner to measure the BER value, and upon obtaining a BER value that is lower than the BER threshold, remaining scan and controlling transmission gains are stopped, and the receiving direction is determined. Thereby, by deleting scans in all directions in the adjustment of receiving directions for all channels, improving the reception sensitivity in a weak electric field, and determining the receiving direction by measuring and assessing the BER value, meaningless time for the direction adjustment can be saved, and the best reception condition can always be obtained quickly.

3 Claims, 6 Drawing Sheets

FIG. 5

[Best receiving BER value standard is set to below $3 \times 10^{-6}$ as an error rate]

| CH \ Direction | CH-1 | | | | CH-2 | | | | CH-3 | | | |
|---|---|---|---|---|---|---|---|---|---|---|---|---|
| | OFF | Low | Middle | High | OFF | Low | Middle | High | OFF | Low | Middle | High |
| D01 | ○ | – | – | – | | | | | | | | |
| D02 | | | | | $3 \times 10^{-2}$ | $8 \times 10^{-3}$ | × | × | | | | |
| D03 | | | | | $5 \times 10^{-5}$ | $2 \times 10^{-6}$ | – | $2 \times 10^{-5}$ | | | | |
| D04 | | | | | × | × | × | × | | | | |
| D05 | | | | | | | | | $9 \times 10^{-2}$ | $2 \times 10^{-2}$ | $7 \times 10^{-3}$ | $8 \times 10^{-4}$ |
| D06 | | | | | | | | | $8 \times 10^{-3}$ | $9 \times 10^{-6}$ | $7 \times 10^{-7}$ | – |
| D07 | | | | | | | | | | | | |
| D08 | | | | | | | | | | | | |
| D09 | | | | | | | | | | | | |
| D10 | | | | | | | | | | | | |
| D11 | | | | | | | | | | | | |
| D12 | | | | | | | | | | | | |
| D13 | | | | | | | | | | | | |
| D14 | | | | | | | | | | | | |
| D15 | | | | | | | | | | | | |
| D16 | | | | | | | | | | | | |

Circles indicate receiving directions, amplification transmission gain levels, and BER values determined for each channel.

FIG. 6

Receiving direction table 40

| Channel number 41 | ADD flag 42 | Best receiving direction number 43 | Amplification transmission gain level 44 |
|---|---|---|---|
| 1 | O | D01 | OFF |
| 2 | O | D03 | Low |
| 3 | O | D06 | Middle |
| ⋮ | | | OFF |
| P | | $D_M$ | OFF |
| 128 | O | D16 | High |
| 129 | | D12 | OFF |

DIGITAL TELEVISION BROADCAST SIGNAL RECEIVER

BACKGROUND OF THE INVENTION

1. Field of the Invention

The present invention relates to a digital television broadcasting signal receiver to receive digital television broadcast signals, such as ATSC (Advanced Television Systems Committee).

2. Description of the Related Art

Since, in North America where the ATSC digital television broadcast (TV broadcast) is provided, large cities are located in plain fields, and TV broadcast signals come from various directions from the viewpoint of users who receive TV broadcast signals sent from around each city, users need to adjust the direction of antennas towards the broadcast station which broadcasts programs they wish to watch. Therefore, a multi-directional antenna is coming into practical use.

According to the EIA-909 specification, a smart antenna is defined to have receiving directions in each of 16 directions into which a circle is divided. Meanwhile, as a digital television broadcast signal receiver that receives TV broadcast signals, it is set to be adjustable for the receiving direction of a multi-directional antenna for all 16 directions in order to comply with the EIA-909 specification.

On the other hand, there are some digital television broadcast signal receivers (digital TV broadcast signal receiver) that are equipped with an auto-scan function to select the antenna direction that can best receive TV broadcast signals of channels selected by a user.

In addition, the following methods are known: a method of watching programs via digital broadcast in good condition by switching transmission gains of a boot circuit for digital broadcast waves that are input to a tuner, even in the case of mixture of the digital broadcast and the existing broadcast with analog signals (see Japanese Unexamined Patent Application Publication 2003-274312); a method of making reception conditions better in ground wave digital broadcast receivers by calculating BER (BIT ERROR RATE) values with a decoder for digital broadcast signals as needed and controlling the existence of an antenna amplifier with the value (see Japanese Unexamined Patent Application Publication 2003-101428); and a method of performing actions, such as the frequency seek action, with AGC judgment values which are automatically adjusted by AGC voltage values based on the broadcast receiver specific reception limit BER, with the controlling of transmission gains of a tuner with AGC (see Japanese Unexamined Patent Application Publication 2003-101426).

BRIEF DESCRIPTION OF THE DRAWINGS

FIG. 5 is a diagram showing an example of measurement for BER values obtained by the above auto-scan action.

FIG. 6 is a receiving direction table created by the entire area scan process.

DISCLOSURE OF THE INVENTION

Figure 1:
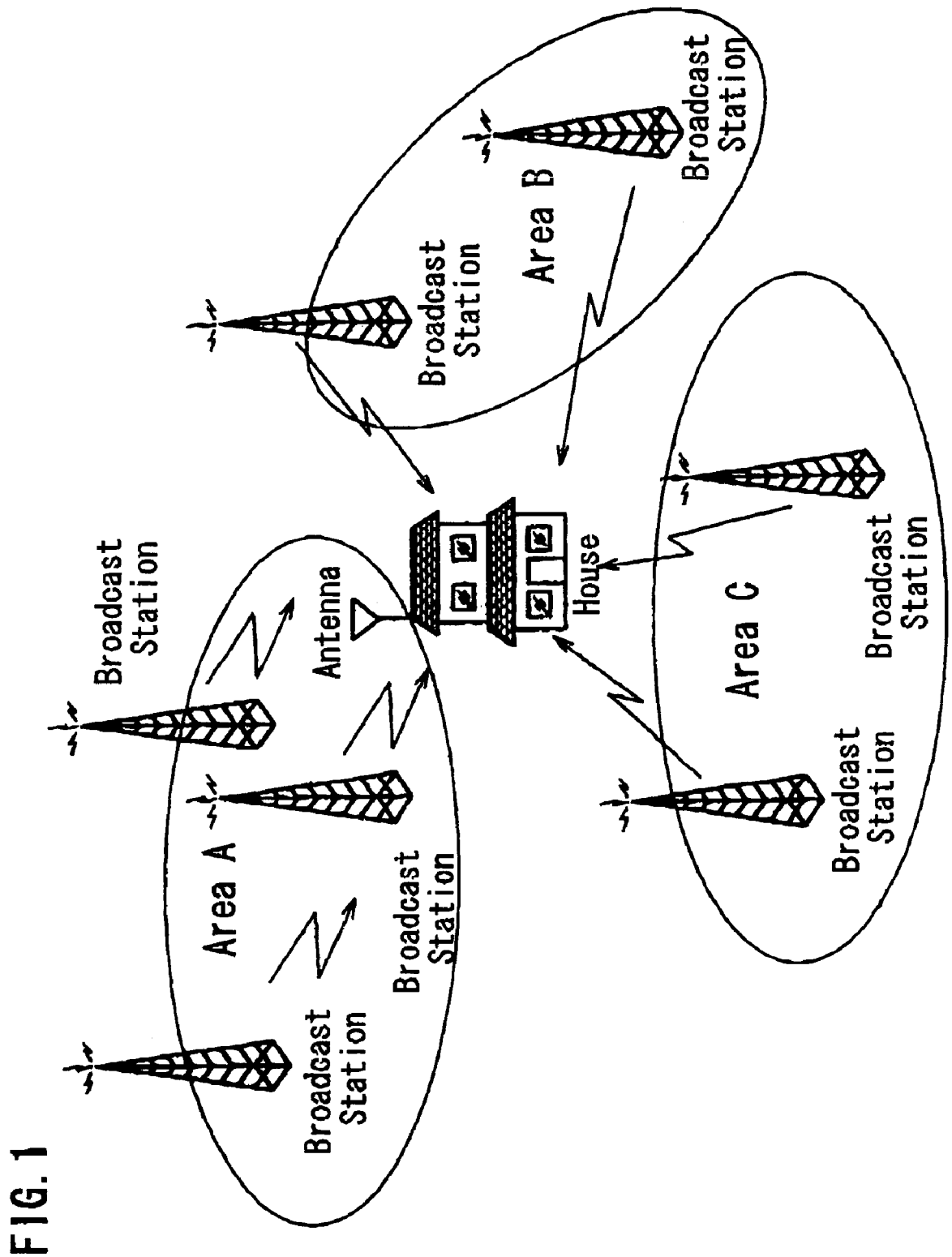
FIG. 1 is a conceptual diagram showing a state in which a user receives digital TV broadcast signals at home.

For the direction setting of an antenna in the digital broadcast, the receiving direction can be set by auto-scanning 16 directions for each channel and selecting the direction with the best reception conditions for it because the locations of broadcast station's antennas, which are broadcast towers, usually do not change. However, scanning all directions for every channel requires a significant amount of time, and thereby frustrates users because they cannot quickly receive signals. Because the broadcast electric field strength for each channel is not always constant, and there are variations in the reception electric field strength, if radio waves are weak, amplifying them to a certain level is necessary with a high-frequency amplifier (RF amplifier) in order to decode the received radio waves; plus, on the other hand, if radio waves are too strong, transmission gains of the RF amplifier need to be lowered to prevent the generation of jamming noise due to intermodulations at the RF amplifier or the tuner. Also, since BER (Bit Error Rate) values of a digital decoder are significantly affected by the amplification transmission gain level of the RF amplifier, the amplification transmission gain level needs to be set to the best condition.

SUMMARY OF THE INVENTION

An object of the present invention is to provide a digital TV signal receiver that can reduce meaningless search turns of a multi-directional antenna and select the best receiving direction quickly upon auto-scanning, as well as acquiring high quality TV signal reception with positive receiving sensitivity and little noise by setting the amplification transmission gain level of the RF amplifier to a state making the BER value lower, which enables the acquisition of the best reception condition at all times.

According to a feature of the present invention, a digital television broadcast signal receiver in which a multi-directional antenna having multiple receiving directions is connected, and television broadcast signals are received by enabling one receiving direction, comprises a control signal output unit for outputting control signals to specify a receiving direction for receiving television broadcast signals to the multi-directional antenna; a tuner, to which the multi-directional antenna is connected, for receiving television broadcast signals, a memory for temporarily storing signal processed by the broadcast signal process method; a main controller for controlling a digital television broadcast signal receiver; an error detection unit which decodes television broadcast signal received by the tuner and detects a BER (Bit Error Rate) value; a memory for temporarily storing the BER value detected by the error detection unit; and a receiving direction determination unit for determining the best receiving direction for each receivable channel, based on the BER value stored in the memory, wherein the receiving direction determination unit consecutively scans all receiving directions of said multi-directional antenna for receivable channels and, when the BER value in each scanned receiving direction reaches a certain level that is lower than the set BER threshold which enables the reception of TV signals, determining a direction scanned at the time as the best receiving direction for the channel and stopping the scan there.

By such a configuration, since scanning can be stopped when the BER value reaches a certain level or less while auto-scanning, there is no need to scan all directions, and quick direction selection is possible. In addition, while the reception sensitivity is improved by installing the RF amplifier, the best amplification transmission gain of the RF amplifier is obtained for each channel by enabling the RF amplifier to control transmission gains, and while auto-scanning, meaningless search turns of a multi-directional antenna can be reduced, and the best receiving direction can be selected quickly by enabling the acquisition of the best values for the receiving direction, the reception sensitivity, and the BER value, as well as high quality TV images which can be received with positive reception sensitivity and little noise, enabling the acquisition of the best reception condition at all times.

DESCRIPTION OF THE PREFERRED EMBODIMENTS

A digital TV broadcast signal receiver relating to an embodiment of the present invention is explained with reference to the figures. FIG. 1 shows a state in which a user receives TV broadcast signals at home. In areas where the digital (ground wave) TV broadcast is provided, if the strength of received digital TV broadcast signals is over a certain threshold, a certain quality of images can be obtained by correction, etc. Therefore, as shown in FIG. 1, TV films can be watched by receiving the TV broadcast signals which are sent from broadcast stations that exist in multiple locations, such as area A, area B, and area C. Supporting these situations, a multi-directional antenna called a smart antenna, which has multiple receiving directions, comes into practical use.

The digital TV broadcast signal receiver can also receive analog TV broadcasting signals and, as well as the digital TV broadcast signals, perform the lean and best receiving direction control while confirming the number of receiving directions of a multi directional antenna. Therefore, when the digital TV broadcast signals and analog TV broadcast signals are not especially required to be recognized, signals will simply be referred to as TV broadcast signals.

On the other hand, a digital TV broadcast signal receiver that complies with the EIA-909 specification must be able to switch directions to all 16 receiving directions regardless of the type of connected multi-directional antenna or the number of receiving directions.

When a multidirectional antenna is connected, the digital broadcast signal receiver relating to this embodiment receives TV broadcast signals for each of 16 receiving directions defined in the specification and measures the reception condition The direction of the maximum receiving strength for signals of each receiving channel is stored, and a multi-directional antenna is pointed in the best direction as soon as a channel is selected.

Figure 2:
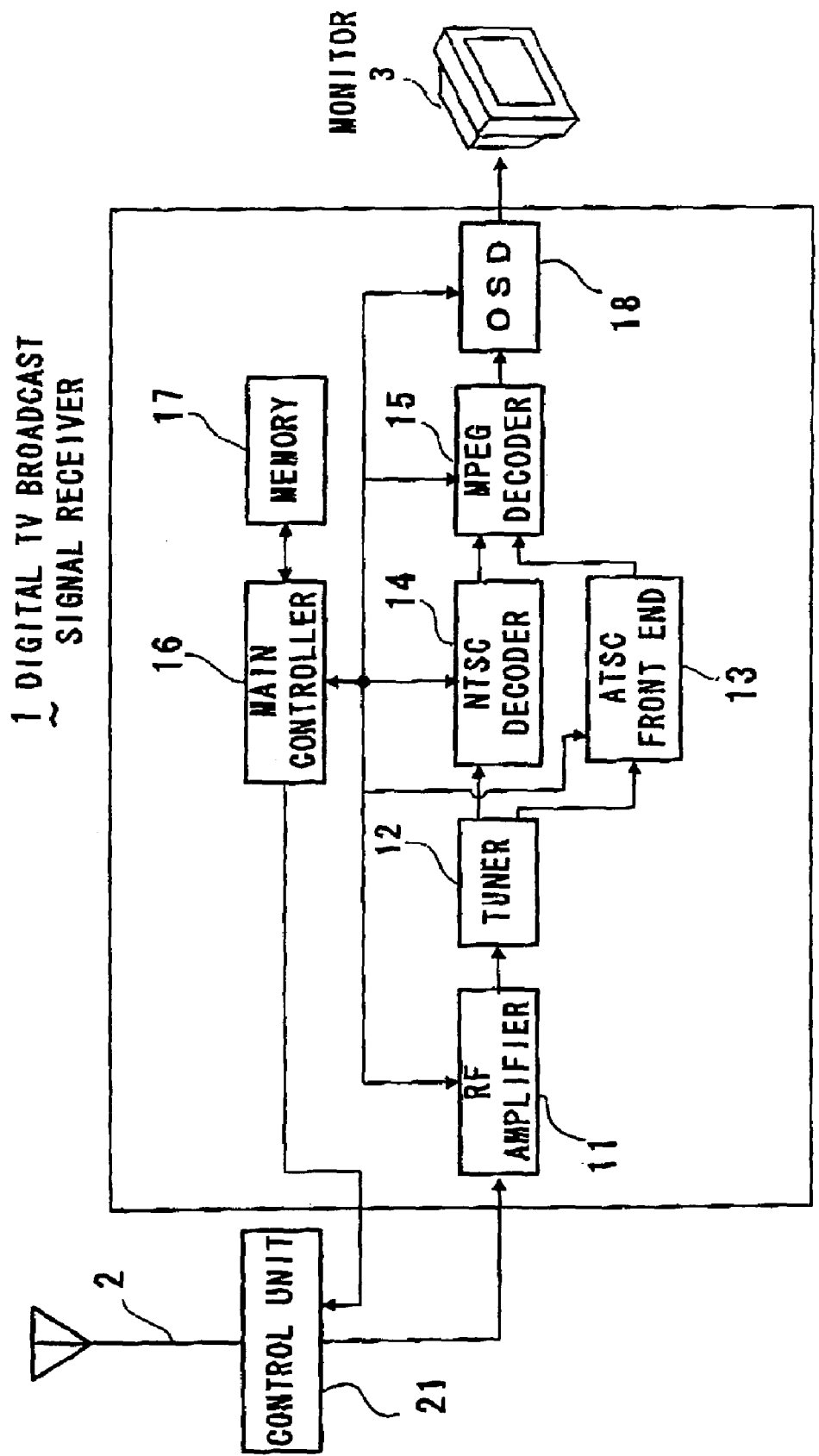
FIG. 2 is an electrical block diagram showing the structure of a digital TV broadcast signal receiver relating to an embodiment of the present invention.

FIG. 2 shows a configuration of a digital TV broadcast signal receiver 1 relating to this embodiment. The digital TV broadcast signal receiver 1 is comprised of an RF amplifier 11, which is connected to a multi-directional antenna 2 and consists of an RF amplifier that amplifies TV broadcast signals, a tuner 12, which selects and receives TV broadcast signals, an ATSC front end (digital signal process unit) 13, which performs certain signal processes for digital TV broadcast signals received by the tuner 12 and decodes them, an NTSC decoder (analog signal process unit) 14, which decodes analog TV broadcast signals received by the tuner 12, an MPEG decoder (signal output unit) 15, which decodes TV broadcast signals compressed with MPEG, an on-screen display part (OSD) 18, which overlaps certain display images on decoded TV broadcast signals, a main controller (CPU) 16, which functions as a method to control the ATSC front end 13 or the NTSC decoder 14 as well as controlling a control unit 21 of the multi-directional antenna 2 (functions as a receiving direction determination unit and a control signal output unit) and detecting the reception condition of TV broadcast signals received by the tuner 12, and a memory 17, which stores decoded TV broadcast signals temporarily and stores display images overlapped on decoded TV broadcast signals. TV broadcast signals decoded by the MPEG decoder 15 are output to a monitor device 3 through the on-screen display part 18 and displayed. In the RF amplifier 11, the amplification transmission gain is controlled by transmission gain control signals from the main controller with four levels in the simple ascending order of OFF, Low, Middle, and High. In addition, the tuner 12 functions as a tuner with the ATSC decoder 13 and the MPEG decoder 15 as well as an error detection unit that decodes received digital TV broadcast and detects BER (BIT ERROR RATE) values. Also, digital TV broadcast enables data transmission from the digital TV broadcast signal receiver 1 on the user's side to a broadcast station, but it does not have a direct relation with the present invention, so the explanation will be omitted.

The control unit 21 of the multi-directional antenna 2 starts according to control signals from the main controller 16 and enables only a designated direction in multiple receiving directions of the multi-directional antenna 2 after a multi-directional antenna is detected. When the multi-directional antenna 2 is a type that switches the receiving direction by swinging an antenna with a motor, the control unit 21 controls the turn of the motor to point the antenna in the designated direction. On the other hand, when the multi-directional antenna 2 is a type that switches the available antenna directions by turning on/off electronic switches, only an electronic switch connected to the antenna in a designated direction is turned on, and other electronic switches are turned off.

Figure 3:
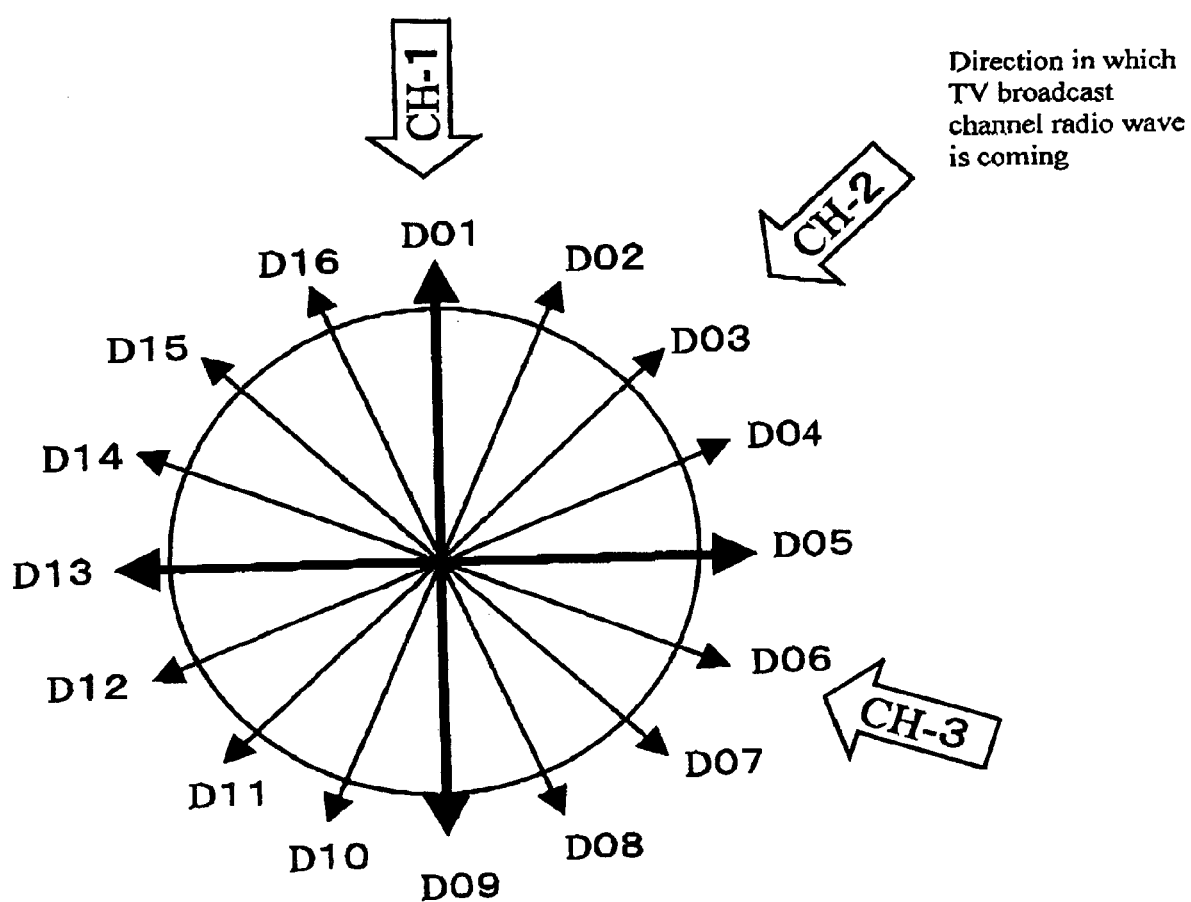
FIG. 3 is a diagram showing an example of antenna directions and the reception condition of the TV broadcast signals.

FIG. 3 shows an example of reception conditions in different directions of an antenna for TV broadcast signals in the case in which the multi-directional antenna 2 (smart antenna) has 16 receiving directions defined in the EIA-909 specification. In the figure, symbols D01 through D16 indicate the 16 receiving directions defined in the EIA-909 specification. Radio wave arrival directions for each channel of TV broadcast are indicated, for example, by CH-1, CH-2, CH-3 (CH is an abbreviation for channel) in bold arrows, and the figure shows an example of reception conditions for antenna directions.

Figure 4:
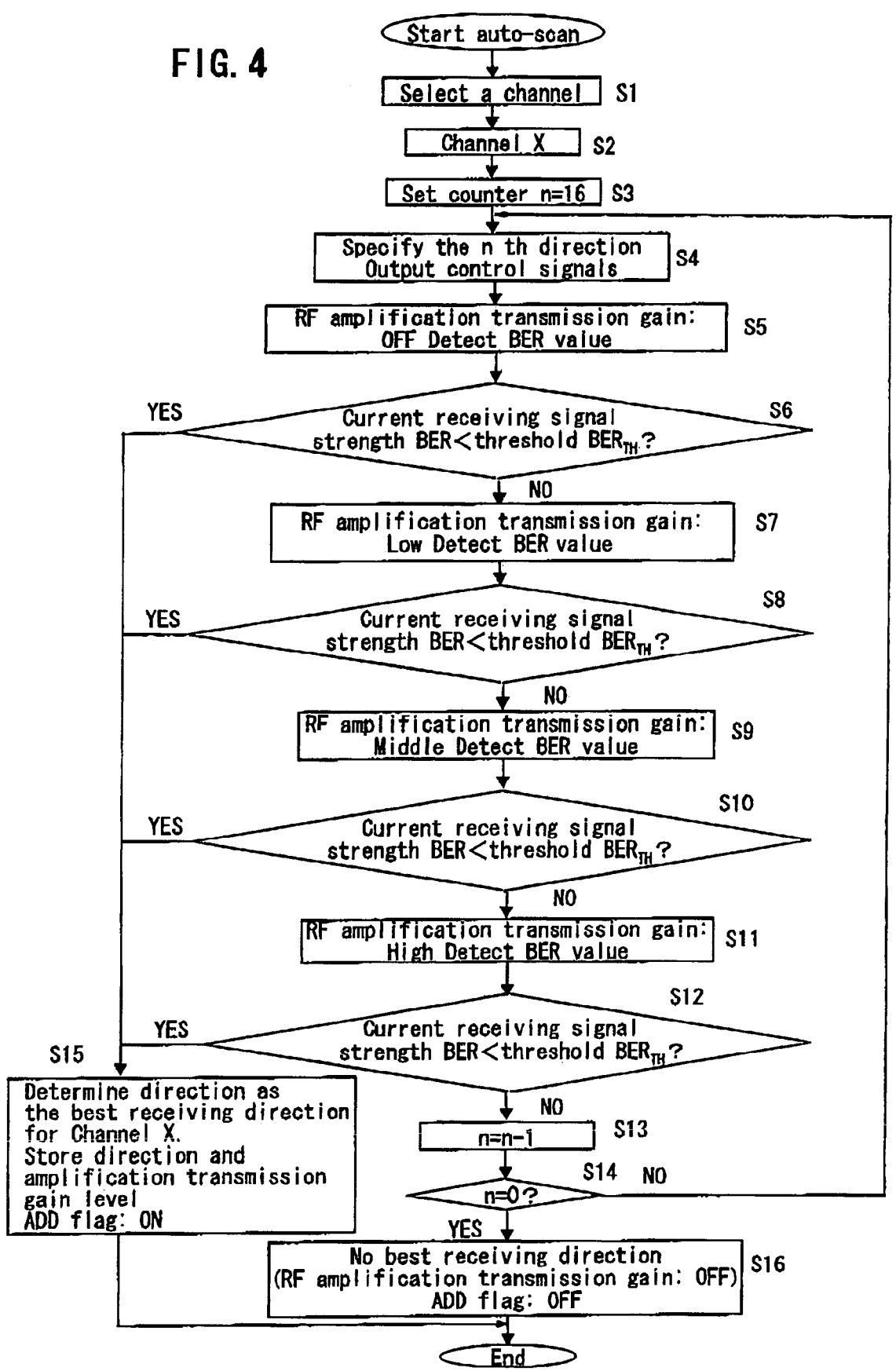
FIG. 4 is a flowchart showing the auto-scan action of the above digital TV broadcast signal receiver.

Next, the receiving direction control of the multi-directional antenna 2 by the main controller 16 of the digital TV broadcast signal receiver 1 is explained with reference to the flowchart shown in FIG. 4. First of all, in FIG. 4, when the main controller 16 detects that the tuner 12 is connected to the multi-directional antenna 2, the auto-scan starts, and when, by selecting a channel (S1), Channel X is set (S2), the main controller 16 sets n=16 to the counter (S3), and it outputs control signals to specify the nth direction (S4). After the control signals are output to the control unit 21 of the multi-directional antenna 2, and time required to switch the receiving direction of the multi-directional antenna 2 passes, TV broadcast signals of Channel X are received by the tuner 12 through the RF amplifier 11, which its amplification transmission gain has been set to LOW by the main controller 16, the signals are decoded by the ATSC decoder 13 and the MPEG decoder 15, and a BER value is detected (S5). The detected BER value is compared with the BER threshold set as a receiving standard, and if the BER value of the current receiving signal strength is lower than the BER threshold, it is determined to be able to obtain sufficiently high quality reception (YES in S6), the current receiving direction is determined as the antenna direction for Channel X, the direction and the transmission gain control level are stored in the memory 17, and the ADD flag is registered as being turned on (S15).

Next, if the answer is NO in S6, the amplification transmission gain level of the RF amplifier 11 is set to MIDDLE, and the BER value is detected as above, and if the detected BER value is lower than the BER threshold (YES in S6), the best receiving direction for Channel X is determined in S15, the direction and the RF transmission gain control level are stored in the memory 17, and the ADD flag is registered as being turned on (S15). Hereinafter, in the same manner even in S9, S10, S11, and S12, the RF amplification transmission gain level is changed from Middle to High, if the obtained BER value is lower than the BER threshold, while the best receiving direction is determined, the direction and the RF amplification transmission gain level are stored in the memory 17 (S15), the ADD flag is registered as being turned on (S15), and the procedure is finished. Also, ON in the ADD flag indicates a state in which a given channel is registered as a receivable channel.

On the other hand, when the obtained BER value does not become lower than the BER threshold even if the amplification transmission gain level of the RF amplifier is changed to four levels, the counter is decreased by one (S13), a similar measurement is performed changing to the next receiving direction, and the scan is stopped to determine the direction when a lower ER value than the BER threshold is obtained. The measurement is repeated changing the direction until a lower BER value than the BER threshold is obtained, it is determined whether BER values of digital TV broadcast signals are measured for the receiving directions of all 16 directions (S14), and if BER values of digital TV broadcast signals are not measured for all 16 receiving directions (NO in S14), the process returns to Step S4 to measure a BER value of digital TV broadcast signals for the next receiving direction. When the measurement of BER values of TV broadcast signals is complete for all 16 receiving directions (YES in S14), it is determined to have no best receiving direction, the RF amplification transmission gain level is returned to OFF, the ADD flag is registered as being turned off (S16), and the procedure is finished. Also, OFF in the ADD flag indicates a state in which a given channel is registered as an unreceivable channel.

Next, FIG. 5 is an example of measuring BER values in each receiving channel direction and shows a diagram to explain the process from the BER value measurement, which uses the amplification transmission gain level of the RF amplifier as a parameter, to determine the receiving direction. With the same figure, symbols D01 through D16 indicate numbers of receiving directions for an antenna, and measured BER values for each receiving direction are shown in the table with four levels: OFF, Low, Middle, and High for the amplification transmission gain level of the RF amplifier as parameters. For example, since the BER value is 0 with the amplification transmission gain level, OFF, in the direction D01 in CH-1, it satisfies the condition that the value is lower than the BER threshold, the direction is determined to be D01 at this time, and the process moves to the measurement of the next channel without measuring unmeasured remaining directions or other amplification transmission gain levels. As the next example, in CH-2, the measurement is performed again changing the direction to D02 because the C/N deteriorates due to radio waves which are too weak in the direction D01 making measurement impossible even if the amplification transmission gain level is set to HIGH. In this case, since reception is enabled, but the BER value will not be a value that is lower than the BER threshold (it is temporarily set to 3×10−6) to obtain the best received images, the measurement is performed by further changing the direction to D03, the direction is determined to be D03 at this time by obtaining a BER value that is lower than the BER threshold (3×10−6) for the first time when the amplification transmission gain level is Low, and the scan of the antenna stops. In a similar manner, in CH-3, since a BER value that is lower than the BER threshold cannot be obtained in directions D01 through DOS, and a BER value that is lower than the BER threshold is obtained for the first time when the amplification transmission gain level of direction D06 is MIDDLE, the amplification transmission gain level is determined to be MIDDLE in direction D06, and no more measurements will be performed afterward. As described above, because the direction is determined at the time when a BER value that is lower than the BER threshold to obtain the best received images is obtained, there is no need to measure with the other remaining directions and other amplification transmission gain levels as parameters, and the adjustment of the antenna direction can be easily performed in a short time. In addition, there is a merit in that the amount of semiconductor memory used can be reduced compared to a method like before in which all received measurement data in each direction is stored in a memory for comparison and determination.

FIG. 6 shows the receiving direction table that associates a receiving channel, a receiving direction, and an amplification transmission gain level obtained by the above method. In the same figure, 41 indicates physical TV channels, 42 is ADD flags when selecting a channel, 43 is best receiving direction numbers, and 44 is amplification transmission gain levels; when a given receiving channel is selected, if the ADD flag has the o mark indicating that it is receivable, the best receiving direction number 43 and the amplification transmission gain level 44 are selected immediately, and the best reception can be carried out In addition, amplification transmission gain levels of channels that could not obtain the best receiving direction are set to OFF.

As described above, since scanning can be stopped when the BER (BIT ERROR RATE) value reaches a certain level or less while auto-scanning, and no scanning will be performed for the remaining directions, there is no need to scan all directions, so the direction can be selected quickly. In addition, while the reception sensitivity is improved by installing the RF amplifier, by obtaining the best amplification transmission gain of the RF amplifier for each channel by enabling the RF amplifier to control amplification transmission gain levels, which enables the acquisition of the best value for the receiving direction, the reception sensitivity, and the BER value, while auto-scanning, meaningless search turns of the multi-directional antenna can be reduced, and the best receiving direction can be selected quickly as well as improving the reception sensitivity, high quality TV images can be received with little noise, and the best reception condition can always be provided/obtained.

With the reception of the digital TV broadcast, since, due to the characteristics of digital modulation, high quality TV images that significantly satisfy users can be obtained if a BER value that is lower than a certain level is obtained, determination by a BER value is more accurate than the existing method to determine the best receiving direction with maximum receiving signal strength because of the direct influence on the quality of received TV images, and high quality reception becomes possible at all times.

In addition, the present invention is not limited to the above embodiment, and many variations are possible. The BER threshold can be not only a constant but also a variable. When television images with a high bit rate, higher quality images, and higher quality sounds like hi-vision are received, the level of the BER threshold is lowered to select a receiving direction, the reception of signals with as a small a bit error rate as possible is enabled, and when signals with a low bit rate are received, it is also possible that the BER threshold is increased to make the reception easy.

Also, in this embodiment, the position of the RF amplifier 11 is installed on the side of the digital TV broadcast signal receiver 1, but in order to improve the C/N even a little, it can also be installed on the side of the antenna.

On the other hand, when the RF amplifier that is controlled by the transmission gain is built in the tuner 12, a similar effect to the installation of the RF amplifier 11 can be obtained by directly controlling the tuner 12 for the transmission gain.

This application is based on Japanese patent application 2004-212178 filed Jul. 20, 2004, the contents of which are hereby incorporated by reference.

What is claimed is:

1. A digital television broadcast signal receiver in which a multi-directional antenna having multiple receiving directions is connected, and television broadcast signals are received by enabling one receiving direction, the receiver comprising:
   a control signal output unit for outputting control signals to specify a receiving direction for receiving television broadcast signals to the multi-directional antenna;
   a tuner, to which the multi-directional antenna is corrected, for receiving television broadcast signals,
   a memory for temporarily storing signal processed by the broadcast signal process method;
   a main controller for controlling a digital television broadcast signal receiver;
   an error detection unit which decodes television broadcast signal received by the tuner and detects a BER (Bit Error Rate) value;
   a memory for temporarily storing the BER value detected by the error detection unit; and
   a receiving direction determination unit for determining the best receiving direction for each receivable channel, based on the BER value stored in the memory,
   wherein the receiving direction determination unit consecutively scans all receiving directions of the multi-directional antenna for receivable channels and, when the BER value in each scanned receiving direction reaches a certain level that is lower than the set BER threshold which enables the reception of TV signals, determining a direction scanned at the time as the best receiving direction for the channel and stopping the scan there.

2. A digital television broadcast signal receiver according to claim 1, comprising a radio wave amplifier that amplifies high frequency signals (RF signal) from the multi-directional antenna and can change amplification transmission gains by transmission gain signals from the control signal output unit, and
   the receiving direction determination unit: when, in each scanned receiving direction, the amplification transmission gain of the RF amplifier is changed increasingly for multiple levels, the BER value for the each level is detected, and the BER value reaches a certain level that is lower than the set BER threshold which enables the reception of TV signals, determining a direction scanned at the time as the best receiving direction and stopping, at the time, the scan with the multi-directional antenna for the current receiving channel and the change of the amplification transmission gain by the transmission gain control signals of the RF amplifier.

3. A digital television broadcast signal receiver in which a multi-directional antenna having multiple receiving directions is connected, and television broadcast signals are received by enabling only one receiving direction, the receiver comprising:
   a control signal output unit that outputs control signals to specify a receiving direction for receiving television broadcast signals to the multi-directional antenna;
   a tuner to which the multi-directional antenna is connected to receive television broadcast signals,
   a memory that temporarily stores signals processed by the broadcast signal process method;
   a main controller that controls parts of a digital television broadcast signal receiver;
   an error detection unit that decodes television broadcast signals received by the tuner and detects a BER (Bit Error Rate) value;
   a memory that temporarily stores the BER value detected by the error detection unit;
   a receiving direction determination unit that determines the best receiving direction for each receivable channel, based on the BER value stored in the memory; and a high frequency amplifier that is controlled in transmission gains with four levels: OFF (no transmission gains), Low, Middle, and High, by transmission gain control signals from the control signal output unit,
   wherein the control signal output unit outputting the control signals with a certain interval to scan all receiving directions of the multi-directional antenna in turn by sending control signals to the multi-directional antenna as well as outputting, to the RF amplifier, transmission gain control signals that set the amplification transmission gain level to the four levels each time the direction of the multi-directional antenna is set,
   wherein the error detection unit, for all scanned receiving directions for each channel, detecting a BER value for each amplification transmission gain level that has four levels in the RF amplifier, for the receiving direction and storing the detected BER value in the memory; and the receiving direction determination unit determining a receiving direction of the multi-directional antenna for all channels by, when the BER value reaches a certain level that is lower than a threshold that enables the reception of TV signals, stopping the scan of the multi-directional antenna for the current receiving channel and the change of the amplification transmission gain level in the RF amplifier by the transmission gain control signals at the time, storing the receiving direction and the amplification transmission gain level of the RF amplifier as the best receiving direction and the best amplification transmission gain level for the receiving channel, and performing similar operations for other channels at the same time.

* * * * *